Sept. 1, 1959    R. A. BELL    2,901,762

SCRAPERS, SPATULAS, AND THE LIKE

Filed Aug. 12, 1955

INVENTOR.
Ruth A. Bell
BY

2,901,762

SCRAPERS, SPATULAS, AND THE LIKE

Ruth A. Bell, Cleveland, Ohio

Application August 12, 1955, Serial No. 527,957

2 Claims. (Cl. 15—245)

My invention relates to kitchen implements and relates more particularly to implements of the type ordinarily classified as scrapers, spatulas, or the like.

It is an object of my invention to provide an implement of the type referred to which will be flexible in use and which will adapt itself to curved or irregular surfaces of containers, bowls, etc. to remove food or other particles therefrom.

It is a further object of my invention to provide an implement of the type referred to which is of such improved form that food or other particles present in a container may be expeditiously and easily removed therefrom.

Another object of my invention is to provide an implement of the type referred to which will accomplish the removal of the desired quantity of the contents of a container, bowl, dish, etc. without transference of such contents onto the handle of the implement or the hand of the person employing the same.

In the prior art devices with which I am familiar a wide flat rubber scraper is secured to a relatively narrow long handle and in the event that the user wishes to remove the contents from a jar, etc. which is of greater depth than the depth of the said relatively short scraper a generous amount of the contents of the container will be deposited upon the handle and find its way to the hand of the user. Furthermore, such prior art devices with which I am familiar have a tendency to turn in the hand of the user and render the use of the same as a scraper difficult.

It is thus a further object of my invention to provide a tool of the class referred to which will have many uses in addition to those of the scrapers referred to and which will be relatively inexpensive to manufacture, being composed of but few parts, and highly efficient in use.

Further objects of my invention and the invention itself will become increasingly more apparent from a purview of the description which follows, in which description reference will be made to the accompanying drawings, forming a part hereof, in which drawings.

Figure 1:
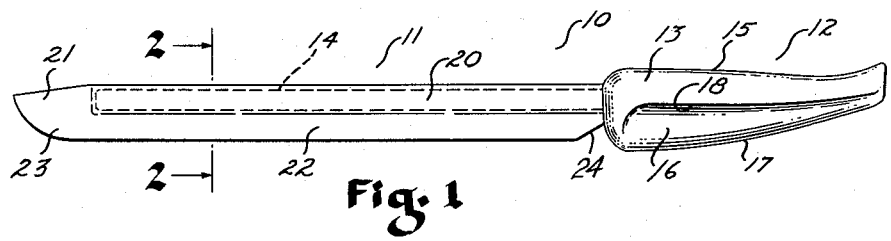
Fig. 1 is a side elevational view of the improved spatula of my invention.
Figure 2:
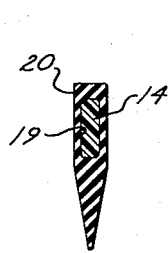
Fig. 2 is a sectional view taken on the line 2—2 of Fig. 1.
Figure 3:
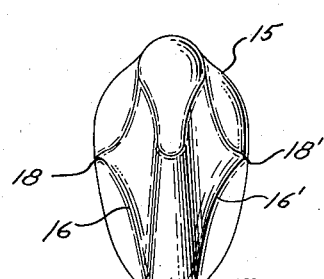
Fig. 3 is a rear view of the handle of Fig. 1.

Referring now to the drawings more particularly, in all of which like parts are designated by like reference characters, at 10 I show the improved spatula of my invention. It will be observed that the spatula consists of a flexible spatula portion 11 and a handle portion 12. The spatula is preferably formed of rubber or other flexible material and the handle is formed preferably of plastic, such as styrene or the like.

The handle portion 12 is provided with a relatively wide grip portion 13 and a stem or shank portion 14 of preferably less width than the grip portion and of less thickness. The grip portion, shown in the drawings herein, is preferably provided with a relatively wide upper surface portion 15, downwardly and inwardly tapered side portions 16 and a relatively narrow lower surface portion 17. The handle is thus easily gripped, the portion of the fingers up to the first joint surrounding the upper surface 15, the rest of the fingers grasping the one side 16 and the underside 17 and the palm the other side 16'. Hence, a firm grasp is had of the handle and the ridges 18 and 18' provided in the handle shown assist in preventing the handle from rotating in the hand of the user.

As will be obvious, a plurality of corrugations or serrations could be provided in the grip portion to accomplish the non-rotational feature of my invention.

Figure 5:
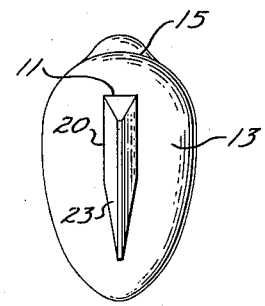
Fig. 5 is a front view of the blade edge of the embodiment of my invention shown in Figs. 1–4 inclusive.
Figure 4:
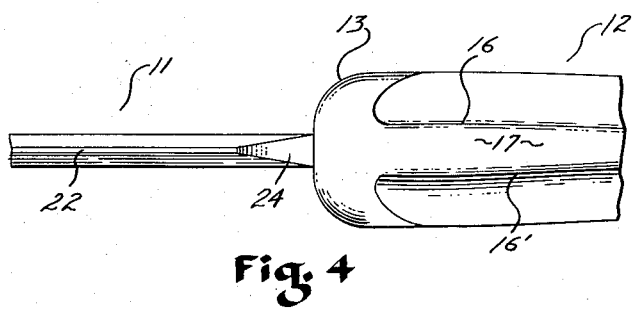
Fig. 4 is a view of the rear of the lower blade edge of the spatula of Fig. 1 and of the handle portions adjacent thereto.

The grip portion of the handle, as stated previously herein, is, in the form herein illustrated and described, formed integrally with a relatively narrow and long shank or stem portion 14 which is generally flat throughout its length and adapted to be projected within a generally similar shaped bore 19 disposed in the flexible spatula member 11 which is provided with a generally elongated stem receiving portion 20, said portion being of relatively thicker dimensions than the tip portion 21 and the blade edge 22. The tip portion is generally of C-shaped form and tapered to an edge of blade thinness merging with the generally downwardly tapered blade edge 23. As shown in Fig. 5, the taper is provided on either side of the shank receiving portions 20.

On the lower edge of the spatula portion 11 adjacent the grip end of the handle, the blade is cut-away or preferably provided with a sharp taper 24 wherefor any contents which are contacted by the flexible blade edge 22 will drop from the blade or be carried a spaced distance from the grip portion of the handle. Further as can be readily understood, a generally V-shaped trough is formed in this space which would receive any contents which might be encountered at this point and assist the same in falling away from the blade and confine the same so that the same would not be carried onto the handle or the hand of the user. The said tapered portion 24 also functions as a rim scraper, since jars containing food, such as sauces or creamy substances, generally are provided with a relatively narrow neck portion and in extracting food from the jar by means of the ordinary scrapers of the prior art with which I am familiar, it is almost impossible to remove the contents adhering to the surfaces of the jar in that area interposed between the relatively narrow neck portion and the remainder of the relatively wider bottle portions. In the improved spatula of my invention, the tapered portion 24 may be disposed against the sides of such portion and will remove any contents adhering thereto. This may be accomplished simultaneously with the removal of the greater part of the contents by the blade portion 11 of the spatula or independently after the removal of the contents thereby, as hereinafter described.

In use, the length of the spatula enables the same to be injected into a large container, such as a pint or quart size mayonnaise jar, or the like, or a blender, and the narrow width of the same enables the same to be injected into a narrow topped bottle, such as a ketchup bottle or the like, and its flexibility enables the user to, with but one circular motion of the same about the inside walls of the container, remove the contents therefrom, and the formation of the handle prevents the same from rotating in the hand of the operator.

While I have described my invention in connection with a preferred embodiment thereof, I do not wish to be unduly restricted to the same, since changes as indicated in the grip portion of the handle, or changes in dimension, etc. might be made, without however, departing from the spirit of my invention or the scope of the appended claims.

What I claim is:

1. A spatula, said spatula comprising an elongated blade member, a handle disposed at one end thereof, said handle being relatively rigid and said blade member being relatively flexible, said handle being of relatively diametrically greater thickness in every transverse direction than said blade portion, said blade portion having its upper longitudinally extending portions of greatest thickness and its lower longitudinally extending portions of least thickness, the rearmost portion of the lower portion of said blade being tapered upwardly with respect to the lower downwardly extending edge of said blade and with respect to the adjacent forwardly disposed edge of said handle, said handle forward edge being tapered downwardly with respect to the adjacent rearmost upwardly tapered edge of the blade wherefore a V-shaped trough is formed therewith.

2. A spatula comprising an elongated member having a portion of greatest thickness and rigidity adjacent one edge thereof, said elongated member having a flexible blade portion adjacent the opposite edge thereof and a flexible tip, a handle for said elongated member disposed at an end thereof opposite said tip and being in substantial axial alignment with said member, the rearmost portion of said flexible blade portion being obliquely tapered with respect to the remainder of the blade portion and said taper proceeding in the direction of said handle to form a generally V-shaped trough therebetween, the handle being of diametrically greater thickness in every transverse direction than said blade portion.

References Cited in the file of this patent

UNITED STATES PATENTS

| | | |
|---|---|---|
| 237,681 | Fuller | Feb. 15, 1881 |
| 835,709 | Miller | Nov. 13, 1906 |
| 1,498,155 | Dorr | June 17, 1924 |
| 2,046,599 | Andrews | July 7, 1936 |
| 2,207,651 | Batchelder | July 9, 1940 |
| 2,256,650 | Reid | Sept. 23, 1941 |